United States Patent
Seim (10) Patent No.: US 8,899,269 B2
(45) Date of Patent: Dec. 2, 2014

(54) MANIFOLD

(75) Inventor: Lars Seim, Espeland (NO)

(73) Assignee: Framo Engineering AS, Bergen (NO)

( * ) Notice: Subject to any disclaimer, the term of this patent is extended or adjusted under 35 U.S.C. 154(b) by 1349 days.

(21) Appl. No.: 11/887,605

(22) PCT Filed: Mar. 31, 2006

(86) PCT No.: PCT/NO2006/000120
§ 371 (c)(1),
(2), (4) Date: Jun. 30, 2009

(87) PCT Pub. No.: WO2006/104393
PCT Pub. Date: Oct. 5, 2006

(65) Prior Publication Data
US 2009/0266424 A1  Oct. 29, 2009

(30) Foreign Application Priority Data
Mar. 31, 2005  (NO) .................................. 20051611

(51) Int. Cl.
*F16K 11/08*  (2006.01)
*E21B 34/00*  (2006.01)
*F16K 11/085*  (2006.01)

(52) U.S. Cl.
CPC .................................. *F16K 11/085* (2013.01)
USPC .............. 137/625.41; 137/454.6; 137/625.11; 366/339

(58) Field of Classification Search
USPC ............. 137/625.46, 625.11, 625.12, 625.15, 137/597, 625.41, 625.47, 454.6, 625.16; 251/181, 182, 186, 180; 366/339
See application file for complete search history.

(56) References Cited

U.S. PATENT DOCUMENTS

| 2,492,140 A | | 12/1949 | Fike et al. |
| 2,821,998 A | * | 2/1958 | Mayhew .................. 137/625.11 |
| 3,799,191 A | * | 3/1974 | Burkhardt et al. .......... 137/454.2 |
| 4,262,688 A | * | 4/1981 | Bialkowski .................... 137/242 |
| 4,437,521 A | * | 3/1984 | Richardson et al. .......... 166/341 |
| 4,444,218 A | * | 4/1984 | Baugh ......................... 137/236.1 |
| 4,562,860 A | * | 1/1986 | Walter et al. ............... 137/454.6 |
| 4,606,368 A | * | 8/1986 | McCafferty ............... 137/15.22 |
| 4,911,413 A | * | 3/1990 | Baba et al. .................... 251/360 |
| 4,968,334 A | | 11/1990 | Hilton |

(Continued)

FOREIGN PATENT DOCUMENTS

| AT | 404 172 B | 9/1998 |
| EP | 0 198 129 | 10/1986 |

(Continued)

*Primary Examiner* — John Fox
(74) *Attorney, Agent, or Firm* — Merchant & Gould P.C.

(57) ABSTRACT

The invention regards a manifold for fluids, comprising a housing (10) with a center axis (11) and a number of fluid apertures (12,13) through the walls forming the housing (10) and a fluid diverter system (20), comprising a fluid diverter element (25) mounted in the system (20) selectively rotating around an axis, comprising an axial outlet (27) and an inlet (26) which may be positioned in connection with one fluid aperture (12,13) in the housing. The fluid diverter system (20) is axially insert able into the housing (10) and further comprises a ring element (21), with an outer configuration complementary to an inner configuration of the housing (10), which ring element (21) is positioned around the fluid diverter element (25) and connected to the fluid diverter element (25), and which ring element (21) comprises fluid apertures (22A, B) corresponding to the fluid apertures (12,13) in the housing.

17 Claims, 6 Drawing Sheets

(56) References Cited

U.S. PATENT DOCUMENTS

| | | | |
|---|---|---|---|
| 5,035,258 A * | 7/1991 | Garnham | 137/454.2 |
| 6,082,707 A * | 7/2000 | Hosie et al. | 251/172 |
| 6,161,618 A * | 12/2000 | Parks et al. | 166/351 |
| 6,196,266 B1 * | 3/2001 | Breda | 137/625.11 |
| 6,345,645 B1 | 2/2002 | Kenna et al. | |
| 7,343,932 B2 * | 3/2008 | Manson et al. | 137/625.11 |

FOREIGN PATENT DOCUMENTS

| | | |
|---|---|---|
| JP | 57-103977 | 6/1982 |
| NO | 310942 | 8/2001 |
| WO | WO 97/05413 | 2/1997 |

* cited by examiner

MANIFOLD

The present invention regards a manifold for connecting or dividing one of several flows of fluid and diverting the selected fluid flow in the manifold in another direction. The manifold is especially adapted for sub sea use.

There exists several manifolds for connecting several flows of fluids and selectively diverts one of the fluid flows; one example is described in NO patent 310942. In this patent it is described a manifold comprising a housing with several inlet openings, and a common outlet opening arranged in an axial direction of the housing. There are within the housing arranged a diverter element for diverting a flow from one of the inlet openings and axially out of the housing in the opposite direction of the housing outlet opening. The housing has an internal partly spherical surface wherein the inlet openings are arranged for connection with the diverter element.

This manifold is however not specifically suitable in for instance sub sea use. There is a need for a manifold which is easy to install in a remote location. It is also a need for a manifold which may be maintained without having to dismantle the whole manifold from all the piping leading into the manifold. There are normally wear and tear of the elements especially the moving parts, and the sealing between the relatively moving parts and these have to undergo maintenance or be substituted at certain intervals. It is also a need for having a solution where the rotating element for selecting the flow to be tested, securely can be removed from the manifold and hoisted to a floating unit for inspection, repair and or substituting the whole or part of it. It is also a need for a manifold for sub sea use, which is easier to install and thereby more reliable than the known manifolds.

The present invention provides a manifold which fulfils the above mentioned needs.

The present invention relates to a manifold for fluids with the possibility to divert one of the fluid flows out of the manifold to test, measure or perform other tasks with the selected fluid flow.

The manifold comprises a housing with a centre axis. The housing comprises a bottom and walls. A number of fluid apertures are positioned in the walls forming the housing, the housing also comprises means for connecting fluid lines to the housing in connection with the fluid apertures. The manifold further comprises a fluid diverter system, which may be inserted axially into the housing. The fluid diverter system comprises a fluid diverter element mounted in the system selectively rotating preferably around the centre axis. The fluid diverter element comprises an axial outlet and an inlet which may be positioned in connection with at least on of the fluid apertures in the housing.

According to the invention the fluid diverter system further comprises a ring element, with an outer configuration complementary to an inner configuration of the housing, which ring element is positioned around the fluid diverter element, and comprises fluid apertures corresponding to the fluid apertures in the housing. The fluid diverter system, with the ring element and the fluid diverter element connected to each other, may be inserted into or taken out of the housing in an axial direction. This gives that all elements that move in relation to each other during use of the manifold, which elements will experience the most wear and tear, in an easy way may be disassembled from the rest of the manifold, making maintenance and repair of the manifold much easier than prior know manifolds. The static seals between the ring element and the housing are also preferably arranged in the ring element, which makes it possible to also maintain and repair these when the fluid diverter system is disassembled from the hosing.

In a preferred embodiment at least one of the fluid apertures in the housing are a fluid outlet, and at least one of the fluid apertures is a fluid inlet, preferably one outlet and several inlets with different diameters of the inlet and outlet apertures. However it is possibility to have other configurations, for instances several inlets and two outlets, or one inlet and several outlets. There will also be one position in the wall of the ring element where there are no apertures, for the case when one does not want to divert one of the flows, to position the inlet of the fluid diverter element.

Most of the fluid apertures in the housing are preferably arranged with their aperture axis at equal angles in relation to the centre axis. This may for instance be at an angle of 30 or 15 degrees or as in the preferred embodiment of the invention for a sub sea use all apertures both the inlets and the outlet at a right angle and thereby be in a common plane. There is also the possibility of arranging all the inlet openings symmetrically around the centre axis of the housing, and have the outlet opening with a different angle than the inlets.

The outer shape of the ring element preferably corresponds to the internal form of the housing. In a preferred embodiment the ring element has a mainly cylinder shape with a bottom, and is connected to a top flange element which also forms the top element of the housing when the manifold is assembled. The fluid diverter element is arranged within the cylinder shape between the bottom and the top flange element.

According to the invention the inner surface of the ring element is preferably at least in a part spherical, but in one embodiment the inner surface of the ring element may be cylindrical. In the preferred embodiment the inlet apertures are arranged in the spherical part of the inner surface. The diverter element is formed to correspond to the inner surface of the ring element, by having an inlet formed to be in tight abutment around the chosen inlet aperture that should be diverted, and to be rotated to be in contact with the chosen inlet aperture.

There is sealing means arranged at the fluid diverter system for obtaining a sealed connection between ring element and the fluid diverter element. This will be described in more detail below. There are also other seals between the ring element and the housing, arranged at the fluid diverter system.

In the preferred embodiment the outer surface of the ring element is mainly cylindrical. This gives an easy production and also insertion into the housing when installing the manifold in a sub sea location. The ring elements may however in other embodiments have an outer surface formed at least partly as a truncated cone or as a multi sided cylindrical formed element with the different sides with equal or different area, or a combination of the different options.

For use sub sea, in a preferred embodiment the fluid diverter system comprises means for connecting a drive element, for instance an actuator, for rotating the fluid diverter element. The drive element may be releasable attached to the ring element or in preferred embodiment to the top flange element, for easy disconnecting and possibly repair without having to dismantle the manifold. There are also for safety reasons preferably systems for operating the fluid diverter element in addition to the drive element, for instance by having an operating element which may be operated by a diver or a ROV in the case the manifold is used sub sea. Preferably the fluid diverter system comprises means for lifting the system axially out of the housing. This may be hooks or rings or other means for engagement with a lifting tool or ROV.

For secure installation of the manifold in a sub sea location the fluid diverter system and or the housing preferably comprise means for guiding the fluid diverter system in correct position in relation to the housing.

In the preferred embodiment the sealing means between the fluid diverter element and the ring element is a self adjusting metal-metal sealing system. The sealing system comprises in a preferred embodiment a first element, a spring element, a seal booster, a second element and a seal element. The spring element is arranged between the first and the second element, together with the seal booster. The seal booster has a configuration which activated the seal by pressure on both sides. The surface of the seal element faced towards the inner surface of the ring element corresponds to the form of the inner surface of the ring elements, preferably spherical.

The invention will now be explained in more detail with a preferred embodiment with reference to the accompanying drawings, where.

Figure 1:
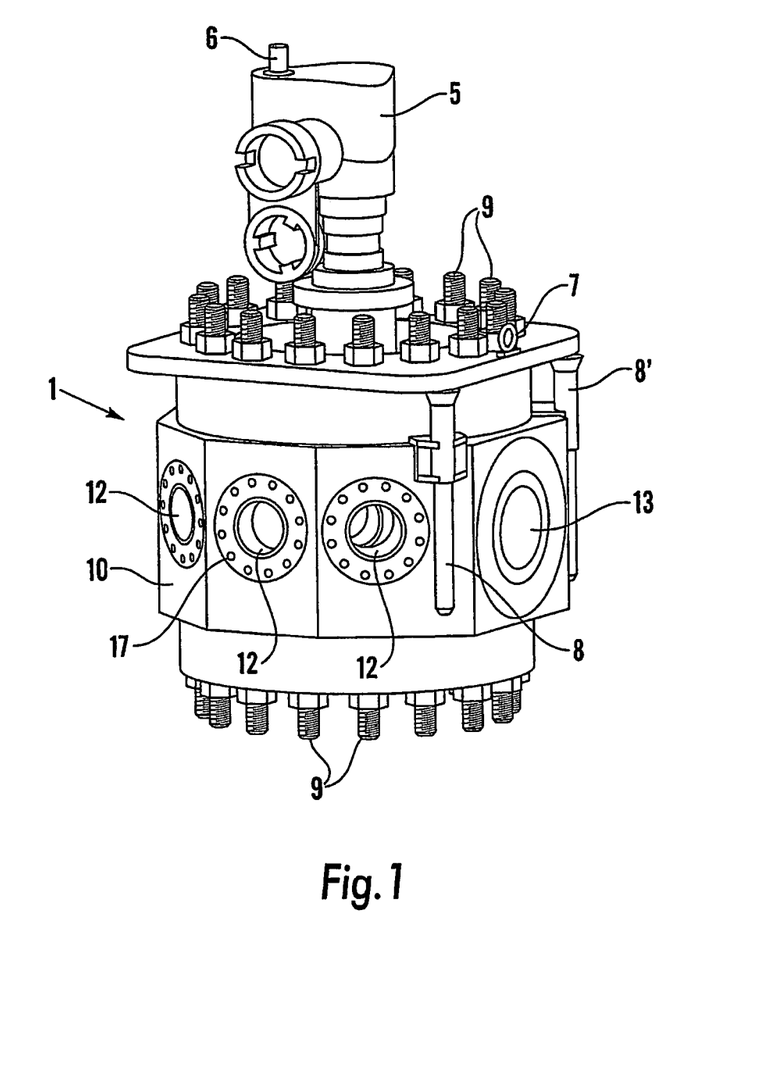
FIG. 1 shows a manifold according to the invention.
Figure 2:
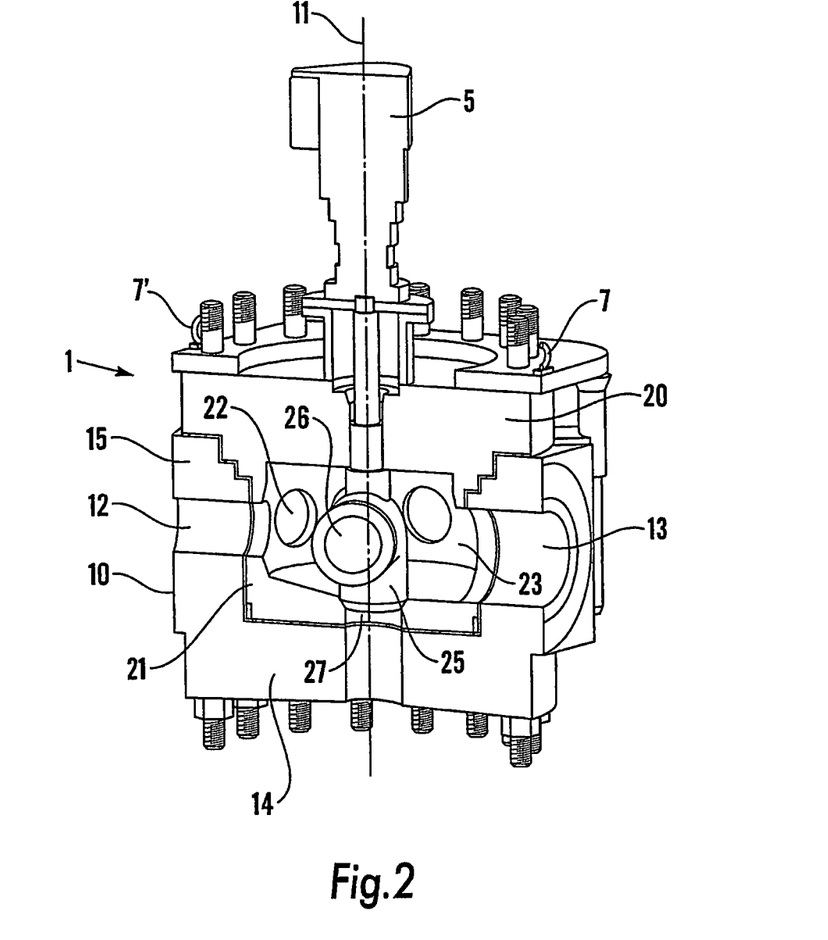
FIG. 2 shows a partly cross section through the manifold in FIG. 1.

In FIG. 1 there is shown a manifold according to the invention, and in FIG. 2 a partly cross section of the manifold in FIG. 1. The same elements are shown in exploded view in FIG. 3 and FIG. 4. The manifold 1 comprises a housing 10, which is mainly cylindrical in its outer form and has a centre axis 11. The housing has in a cross section across the centre axis, preferably a polygonal outer form for easier connection of the piping (not shown) that that should be attached to the manifold. The housing comprises preferably a bottom 14 and walls 15. The walls 15 forming the housing 10 comprise several fluid inlet apertures 12 and an outlet aperture 13. These apertures 12, 13 are all connected in the common void within the housing 10, by this the inlets 12 are connected with the outlet 13. All the inlet apertures 12 have centre axis which all are in a common plane mainly at right angle with the centre axis 11 of the housing 10. Also the outlet aperture 13 has a centre axis parallel with the plane of the axis of the inlet apertures 12.

Within the housing 10 there is a fluid diverter system 20 comprising of a ring element 21 and a fluid diverter element 25. The ring element 21 comprises a mainly cylindrical section with a bottom and a top flange 30 section. The top flange 30 forms a roof of the housing 10 when the manifold is assembled, as shown in FIG. 1 and FIG. 2. The ring element 21 comprises apertures 22A, 22B corresponding to the apertures 12, 13 in the housing 10. The ring element 21 has an outer surface corresponding to an inner form of the housing 10. This may in a cross section be cylindrical, polygonal or tapered in the longitudinal direction of the centre axis of the housing. The main feature is that fluid diverter system 20 easily may be inserted into the housing 10, due to the corresponding inner surface of the housing and the outer surface of the ring element.

The fluid diverter element 25 is arranged rotating about the centre axis 11 of the housing 10, within the ring element 21. The fluid diverter element 25 comprises an inlet 26 which may be positioned in alignment with one of the inlet apertures 12 in the housing 10. The fluid diverter element 25 further comprises an outlet 27 which in the preferred embodiment is oriented in the longitudinal direction of the centre axis 11 of the housing 10. There are in connection with the outlet 27 also an aperture in the ring element 21 bottom and the bottom 14 of the housing 10. There may according to the invention be other configurations of the inlets, outlets and outlet of the fluid diverter element. The inlets may be arranged with an angle other than 90 degrees with the centre axis and the outlet with a different angle.

The fluid diverter element further comprises a drive connection means 28, which extends through the top flange 30 of the ring element 21 and which may be releasable connected to a drive element 5, for instance in the form of an actuator. The drive connection means 28 may also be connected to operation means 6, which may be manually operated or operated by a ROV or other equipments.

There is also a dynamic sealing system between the fluid diverter element 25 and an internal surface of the ring element 21 for achieving a sealed connection between the fluid diverter element 25 and a chosen inlet aperture 22A in the ring element 21. This sealing system will be explained with reference to FIG. 5 to FIG. 7. There are also sealing means between the fluid diverter element's outlet 27 and the ring element 21. There are also static seal systems between the fluid diverter system 20 and the housing 10 sealing the connection between the different apertures, the seals in these systems are arranged on the fluid diverter system 20, which thereby will be drawn together with the fluid diverter system 20, when the manifold 1 is disassembled. There are also as common within the technical field ordinary seals between other elements in the manifold, these will not be explained since it is obvious for a skilled person.

Figure 3:
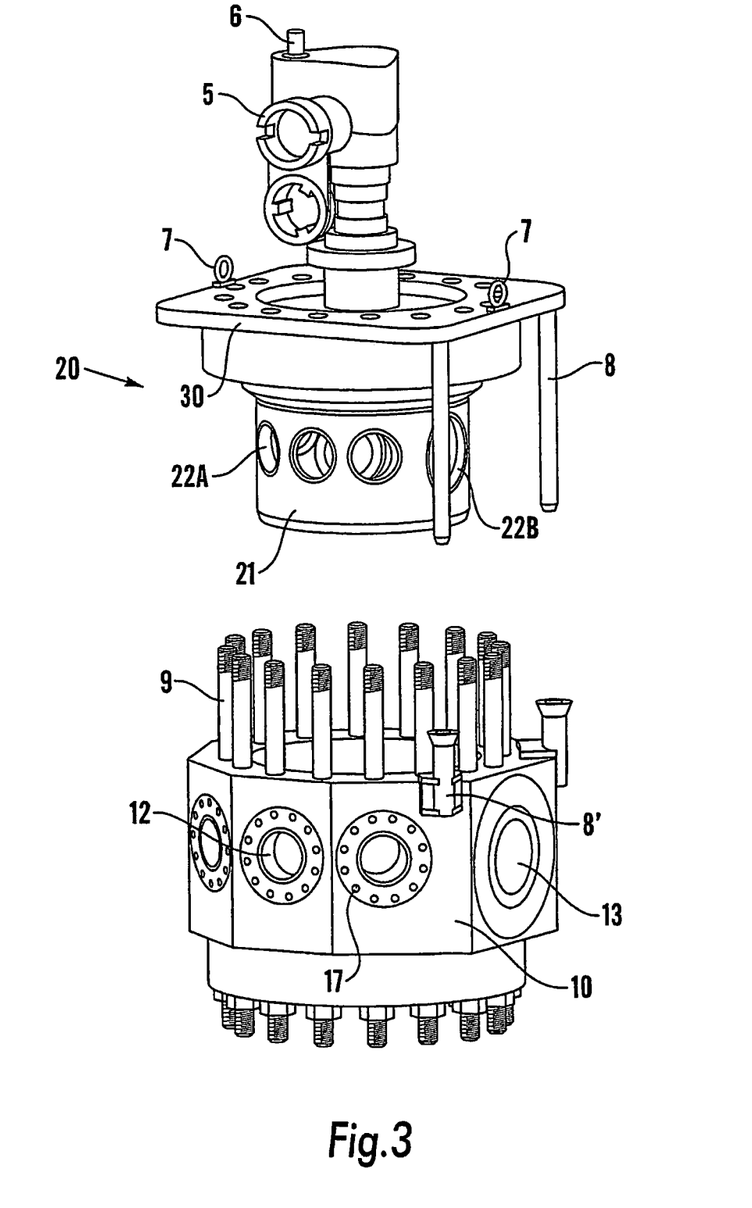
FIG. 3 shows the manifold in an exploded view.
Figure 4:
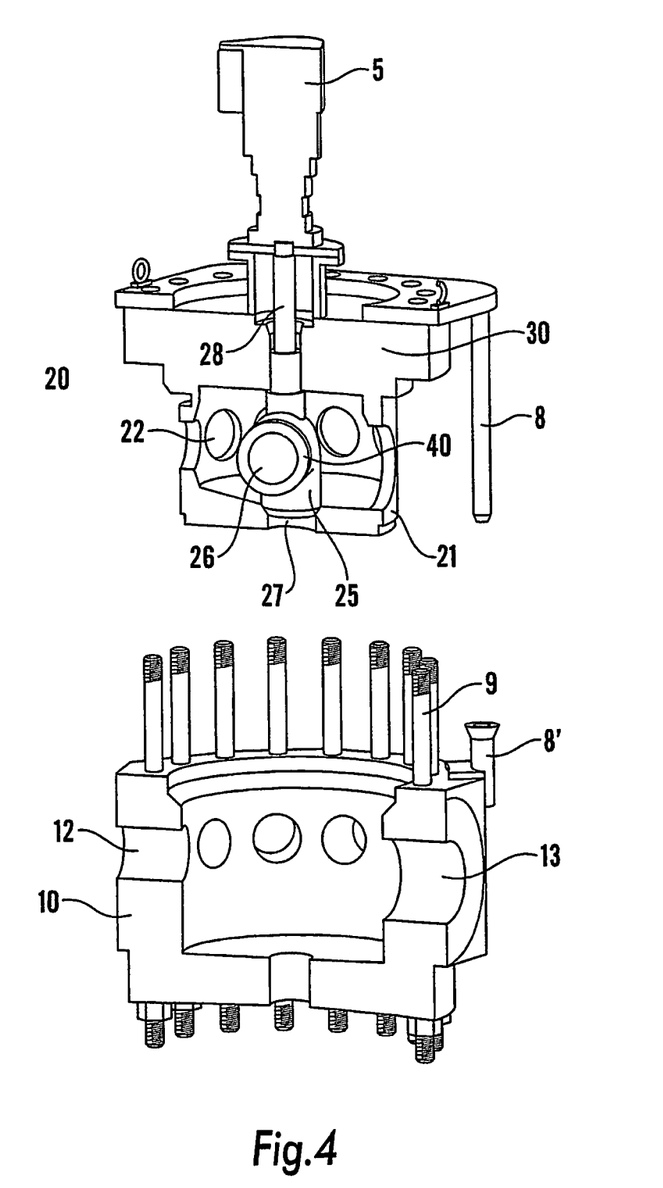
FIG. 4 shows a partly cross section through the manifold in exploded view in FIG. 3.

The fluid diverter system 20 further comprises as best seen from FIGS. 3 and 4 lifting means 7 for lifting the fluid diverter system 20 in to and out of the housing 10 for assembling and disassembling of the manifold. The manifold also comprises guide means 8, 8', in the form of guide pins 8 arranged on the fluid diverter system and guides 8' arranged on the housing 10, for guiding the fluid diverter system 20 with its apertures in correct position in relation to the apertures in the housing 10. The manifold also comprises locking means 9 for locking the fluid diverter system 20 to the housing 10 when the manifold is assembled.

Figure 5:
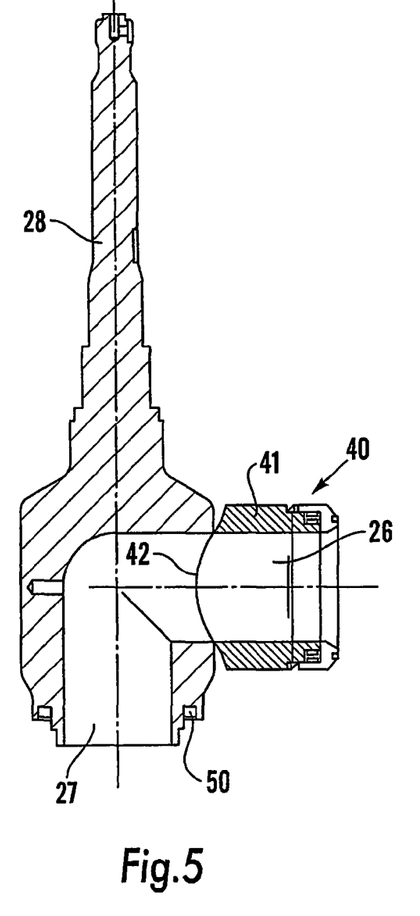
FIG. 5 depicts a cross section of the fluid diverter element with the sealing means according to the invention.
Figure 6:
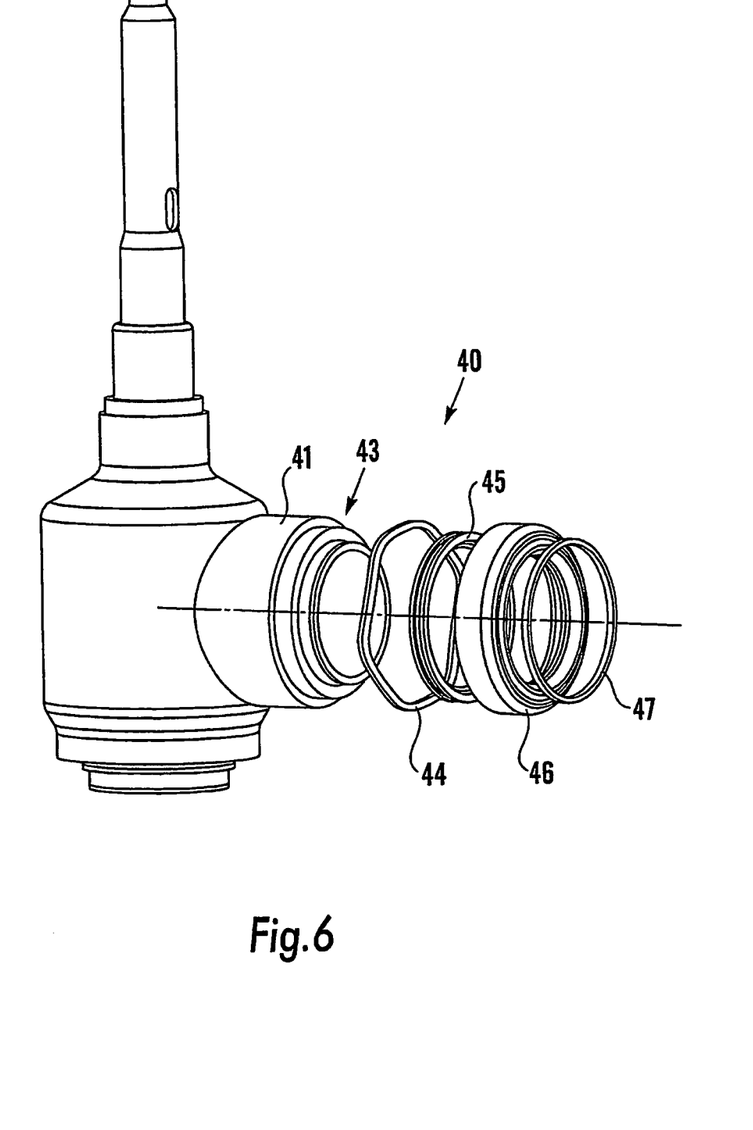
FIG. 6 shows the fluid diverter element with the sealing means in an exploded view.
Figure 7:
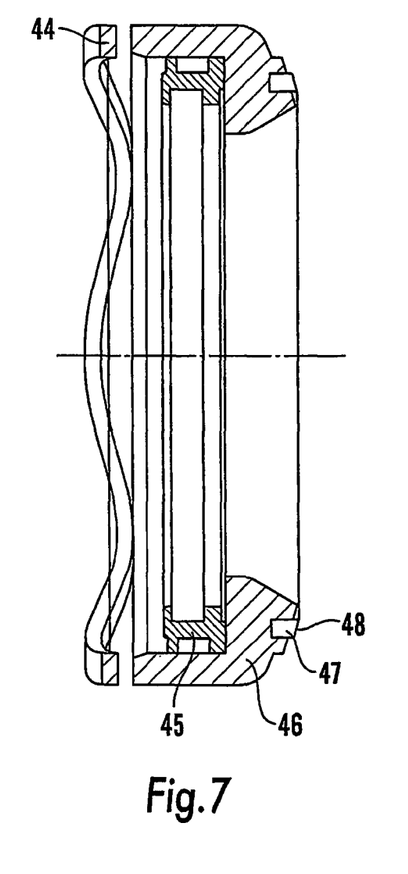
FIG. 7 shows a cross section of parts of the sealing means in FIG. 6.

The dynamic sealing system 40 between the fluid diverter element 25 and the ring element 21 is shown in FIG. 5 to FIG. 7. As seen from the cross section in FIG. 5 the inlet 26 of the fluid diverter element 25, has a sealing system 40 for sealing against the internal surface of the ring element 21 (not shown in FIG. 5-7). The fluid diverter element 25 also has a sealing element 50 around the outlet 27.

The sealing system 40 comprises a first element 41. The first element 41 has a curved surface 42 in static abutment with the fluid diverter element 25. The first element 41 may in a different embodiment be formed as part of the fluid diverter element 25. The first element 41 comprises on the opposite side of the curved surface 42 an end surface comprising several grooves and step surfaces for interaction with other parts of the sealing system 40. The sealing system 40 further comprises a spring element 44, a seal booster 45, a second element 46 and a sealing element 47. The spring element 44 is arranged in between a step surface of the first element 41 and a surface of the second element 46, giving some elasticity between the two elements 41, 46. As best seen from FIG. 7 the seal booster 45 is arranged in a groove in the second element 46 and thereby in connection with the second element 46 on two sides. When the sealing system 40 is assembled a stepped surfaces of the first element 41 will be in abutment against the seal booster 45 on two other sides, as may be seen from FIG. 5. The seal booster 45 has a form and configuration which makes it seal both ways. The second element 46 has in a surface faced away from the fluid diverter element 25 a groove wherein the sealing element 47 is arranged. A surface 48 of the sealing element 47 face towards the inner surface of the ring element 21 has a corresponding configuration to the inner surface of the ring element around the apertures 22, in the preferred embodiment spherical.

The invention has now been explained with a preferred embodiment, there are however possible to make alterations and modifications to this embodiments which are within the scope of the invention as defined in the following claims. It is thinkable to have a housing comprising bottom and walls, and a separate roof which is positioned in abutment against the walls when the fluid diverter system is inserted into the housing. The ring element may not comprise a bottom. The inlets may have a different angle; the means for lifting the fluid diverter system may be any form for connection of lifting equipment, as quick release systems, hooks, clamping surfaces or sections adapted for insertion of gripping equipment, etc.

The invention claimed is:

1. Subsea manifold for fluids, comprising a housing including a number of fluid apertures through walls forming the housing, and a fluid diverter system, comprising:
    a fluid diverter element mounted in the fluid diverter system, wherein the fluid diverter system comprises a ring element having a bottom flange section with an outer configuration complementary to an inner configuration of the housing and a top flange section forming a roof of the housing when the ring element is connected to the housing, which ring element is positioned around the fluid diverter element and connected to the fluid diverter element, and which ring element comprises fluid apertures corresponding to the fluid apertures in the housing; and
    a drive connections means for rotating the fluid diverter element, wherein the drive connection means extends through the top flange section of the ring element and is releasably connected first to a drive actuator element and second to means for operating the rotation of the fluid diverter element manually or mechanically
    wherein the subsea manifold is constructed for use in a subsea environment for connecting or dividing one of several flows of fluid from a subsea well, and wherein the fluid diverter element is axially removable and insertable into the housing for servicing the fluid diverter element.

2. Subsea manifold according to claim 1, wherein at least one of the fluid apertures in the housing is a fluid outlet and at least one of the fluid apertures is a fluid inlet.

3. Subsea manifold according to claim 1, wherein the housing comprises a centre axis and the fluid apertures in the housing are arranged with their aperture axis at equal angles in relation to the centre axis.

4. Subsea manifold according to claim 3, wherein the fluid apertures in the housing are arranged with their aperture axis in a common plane in relation to the centre axis of the housing.

5. Subsea manifold according to claim 1, wherein the inner surface of the ring element is at least partly spherical.

6. Subsea manifold according to claim 1, wherein the outer surface of the ring element corresponds to an internal surface of the housing.

7. Subsea manifold according to claim 1, wherein the means for operating the rotation of the fluid diverter element comprises a ROV equipment.

8. Subsea manifold according to claim 1, wherein the fluid diverter system comprises means for lifting the system axially out of the housing.

9. Subsea manifold according to claim 1, wherein the fluid diverter system and or the housing comprises means for guiding the fluid diverter system in correct position in relation to the housing.

10. Subsea manifold according to claim 1, further comprising static sealing means between the housing and the ring element around the fluid apertures, the static sealing means being attached to the ring element.

11. Subsea manifold according to claim 1, further comprising a sealing system between the fluid diverter element and the ring element wherein the sealing system is a self adjusting metal-metal sealing system.

12. Subsea manifold according to claim 11, wherein the sealing system comprises a spring element, arranged between a first element connected to the fluid diverter element and a second element arranged between the first element and the ring element, a seal booster between the first and second elements and a seal element arranged in a surface of the second element faced against the ring element, which seal element has a surface in abutment against the ring element corresponding to the inner surface of the ring element.

13. Subsea manifold according to claim 12, wherein the surface of the seal element and the inner surface of the ring element are spherical.

14. Subsea manifold according to claim 1, wherein the fluid apertures through the walls forming the housing comprise one outlet and several inlets with different diameters for the inlet and outlet apertures.

15. Subsea manifold according to claim 1, further comprising means for connecting fluid lines to the housing in connection with the number of fluid apertures through the walls forming the housing.

16. Subsea manifold according to claim 1, wherein the fluid diverter system selectively rotates around an axis.

17. Subsea manifold according to claim 1, wherein the fluid diverter system comprises an outlet and an inlet which may be positioned in connection with one fluid aperture in the housing.

* * * * *